No. 873,204.  
PATENTED DEC. 10, 1907.  
E. S. BALLOU.  
FOCUSING ATTACHMENT.  
APPLICATION FILED JAN. 17, 1907.
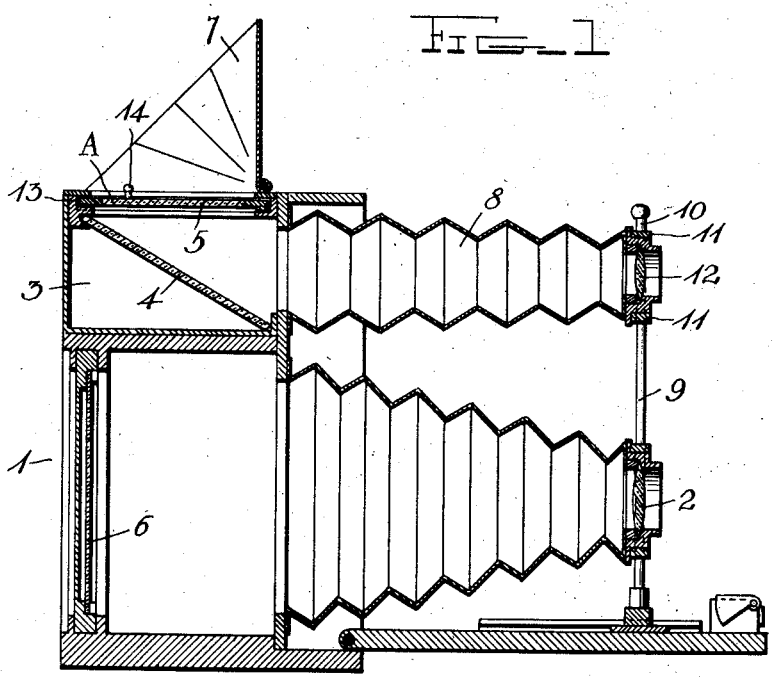
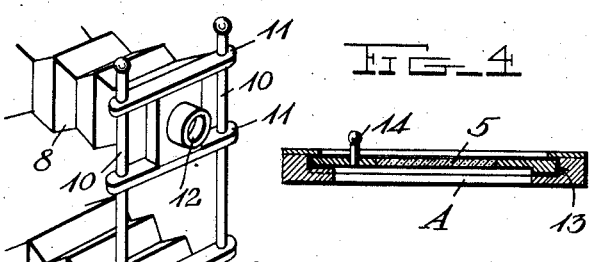
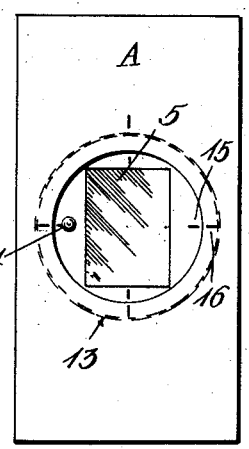
Witnesses  
Inventor  
Ernest S. Ballou  
by  
Attorneys

UNITED STATES PATENT OFFICE.

ERNEST S. BALLOU, OF DES MOINES, IOWA.

FOCUSING ATTACHMENT.

No. 873,204.   Specification of Letters Patent.   Patented Dec. 10, 1907.

Application filed January 17, 1907. Serial No. 352,783.

*To all whom it may concern:*

Be it known that I, ERNEST S. BALLOU, a citizen of the United States, residing at Des Moines, in the county of Polk and State of Iowa, have invented certain new and useful Improvements in Focusing Attachments; and I do declare the following to be a full, clear, and exact description of the invention, such as will enable others skilled in the art to which it appertains to make and use the same.

This invention relates to focusing attachments for cameras, and has for its object to provide a device of this kind which can be formed upon or connected with any ordinary camera, and is for the purpose of permitting the apparatus to be focused while the sensitive plate is in condition for instant exposure, thereby permitting a snap shot picture being taken immediately upon the focusing of the instrument.

The accompanying drawings illustrate the invention, in which,

Figure 1 is a longitudinal sectional view of a camera provided with one form of my improved focusing mechanism; Fig. 2 is a broken perspective view of the front end of the same, showing the means for connecting it with the lens of the instrument; Fig. 3 is a plan view of the finder; Fig. 4 is a sectional view of the same.

Referring more particularly to the drawings, which are for illustrative purposes only and are therefore not drawn to scale,—the numeral 1 indicates a camera of any suitable construction, the bellows of which is connected with the lens mechanism 2 in any suitable manner.

The numeral 3 indicates the main frame work of the finder mechanism, which can be formed as a part of the camera or of an attachment adapted to be secured thereto, in any suitable manner.

Mounted diagonally within the frame 3 is a reflector 4, above which is located a suitable ground glass 5 of the finder, upon which is seen the image of the object to be focused, said image being a duplicate of what will appear upon the film 6 after the exposure has been made. A folding shield 7 is preferably arranged on the box or main frame 3 so as to make the image upon 5 stand out more clearly, in the well known manner.

Connected with the forward end of the box of frame 3 is a suitable bellows 8, which is connected at its forward end with the lens mechanism 2 in any suitable manner, preferably by means of the lens supporting legs 9, which are extended upwardly, as shown at 10. Two cross bars 11 are mounted upon the extensions 10, between which is secured a suitable focusing lens 12. This lens is of the same power as the lens of the camera, but need not be of the same quality, whereby the images that are formed by the two lenses will be duplicates, as above referred to. The lens 12 is adjustable vertically so that its axis can always be kept parallel with the axis of the camera lens whereby the operator can properly focus and locate the image as desired, by observing the glass 5 as though the film or plate 6 were removed from the camera and the ordinary focusing plate substituted therefor.

For the purpose of determining the exact area of the picture or image that will appear upon the negative, the opening in the frame or support 5' for the glass 5 is preferably made rectangular, as shown in Fig. 3, and the frame is mounted in a circular groove or channel 13, and provided with a projection 14, by means of which the frame can be rotated so as to cause the glass to stand lengthwise of the top of the frame 3, as shown in Fig. 3, or transversely to it, as will be understood. The under surface of the frame 5' is preferably corrugated to hold it in any set position, and the upper surface is preferably provided with marks 15, which are caused to register with similar marks 16 on the frame 3, and thereby indicate when the frame 5' is in the desired position.

With a device as above described it is evident that the negative upon the inside of the camera may be placed in condition for instant exposure and the camera opened in the usual manner ready for adjustment. The operator can then proceed to focus the instrument, and as soon as that has been done, as will be indicated by the finder, the shutter may be actuated, and a picture taken instantly, thereby securing the desired result without the possibility of disarrangement of the focus or movement of the object, which is liable to occur if the plate or film must be prepared for exposure after the focusing has been done, as with the ordinary camera. As shown in the drawings, the attachment will add but little to the size of the ordinary camera, owing to the ability to place the glass of the finder in a horizontal position upon one side and arranging the reflector at such an angle that the height of the main frame will be very slight. After the exposure has been made, the shield can be closed down over the glass of the finder, and the lens mechanism collapsed or pushed back into the box of the camera and the front closed in the usual manner. When it is desired to again make an exposure, the camera is opened in the ordinary manner and the lens mechanism pulled outward which will at the same time move forward the finder lens 12, and by opening the shield, the instrument is ready for operation. When constructed in this manner, the ordinary finder may be dispensed with.

Although I have shown what I consider the most desirable form for constructing my invention, it is evident that changes and modifications may be made therein, and I reserve the right to make all such variations as will come within the scope of the invention as set forth in the appended claims.

Having described my invention, I claim:—

1. In combination with a camera having upwardly-extending, lens-supporting legs and a frame, of cross-bars adjustably mounted on said legs, a lens supported between said bars, a bellows connected with the frame and with the lens support, an inclined reflector in the frame at the rear of the bellows, a ground glass in the frame above the reflector, and a folding cover for the ground glass.

2. In combination with a camera, a frame thereon, the top of which is provided with a circular groove and provided with marks, a circular frame rotatably mounted in said groove, the under face of which is corrugated and the outer face provided with marks adapted to register with the marks on the frame, the circular frame being provided with an elongated rectangular opening, a ground glass in said opening, an inclined reflector below said ground glass, means for throwing an image on the reflector, and a pin in the circular frame for rotating it.

In testimony whereof I have hereunto set my hand in presence of two subscribing witnesses.

ERNEST S. BALLOU.

Witnesses:
C. S. COLE, Jr.,
GEO. B. IDICK.